United States Patent [19]
Shepard

[11] Patent Number: 6,061,858
[45] Date of Patent: May 16, 2000

[54] FISHING DEVICE

[76] Inventor: John S. Shepard, 1424 Meeker, Ft. Collins, Colo. 80524

[21] Appl. No.: 09/173,946

[22] Filed: Oct. 16, 1998

Related U.S. Application Data

[60] Provisional application No. 60/062,807, Oct. 24, 1997.

[51] Int. Cl.$^7$ .................................................. B25F 1/00
[52] U.S. Cl. ........................................ 7/106; 7/132; 43/4
[58] Field of Search .............................. 7/106, 125, 132; 43/4; 289/17

[56] References Cited

U.S. PATENT DOCUMENTS

| | | | |
|---|---|---|---|
| 2,926,036 | 2/1960 | Wimberley | 7/106 X |
| 3,808,915 | 5/1974 | Bonnel | 7/106 X |
| 4,899,482 | 2/1990 | Gerdes | 43/4 |
| 5,557,874 | 9/1996 | Pietrandrea et al. | 7/106 X |

Primary Examiner—James G. Smith
Attorney, Agent, or Firm—Ancel W. Lewis, Jr.

[57] ABSTRACT

A fishing device including a pair of opposed first and second arms pivotally connected at a pivot to move between an open position and a closed position. The first arm has a first jaw head at one end and the second arm has a second jaw head at one end. The first and second jaw heads have opposed inside gripping surfaces and further having opposed cutting blade portions that cut in said closed position. A latch is connected to the arms for holding the arms in the closed position and releasing the arms for pivotal movement away from one another to an open position. A first pair of opposed first and second transverse grooves along the inside of the first and second jaw heads forms a line tie hole usable in tying a knot in a fishing line. A second pair of opposed transverse grooves along the inside of said first and second jaw heads at the front end forms an eyelet threading hole through which a line will pass to thread an eyelet held in said grooves by the first and second jaw heads in the closed position. A line guide member on one of the arms is used to engage the line to guide said jaws with the pair of jaw heads gripping a hooked fish to release the fish.

13 Claims, 3 Drawing Sheets

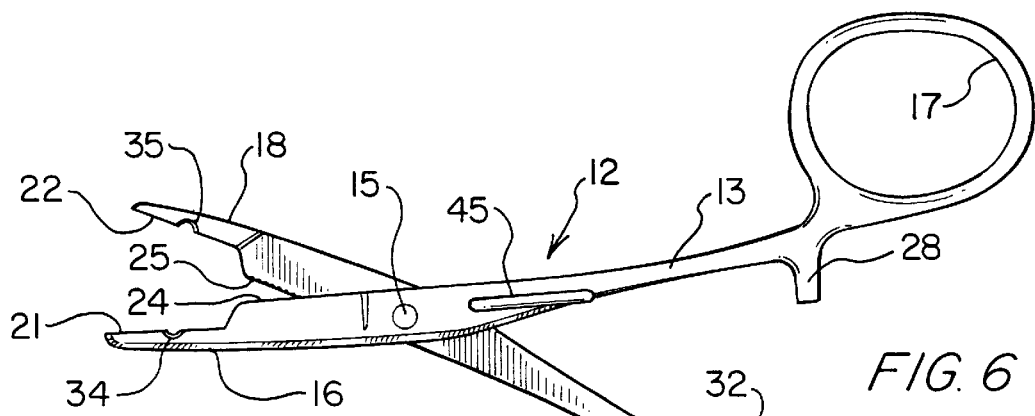
FIG. 6
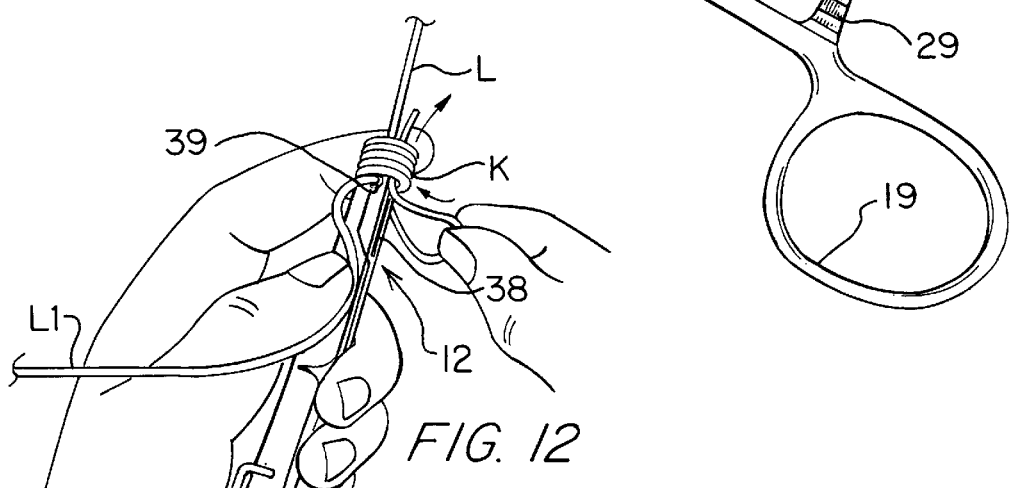
FIG. 12
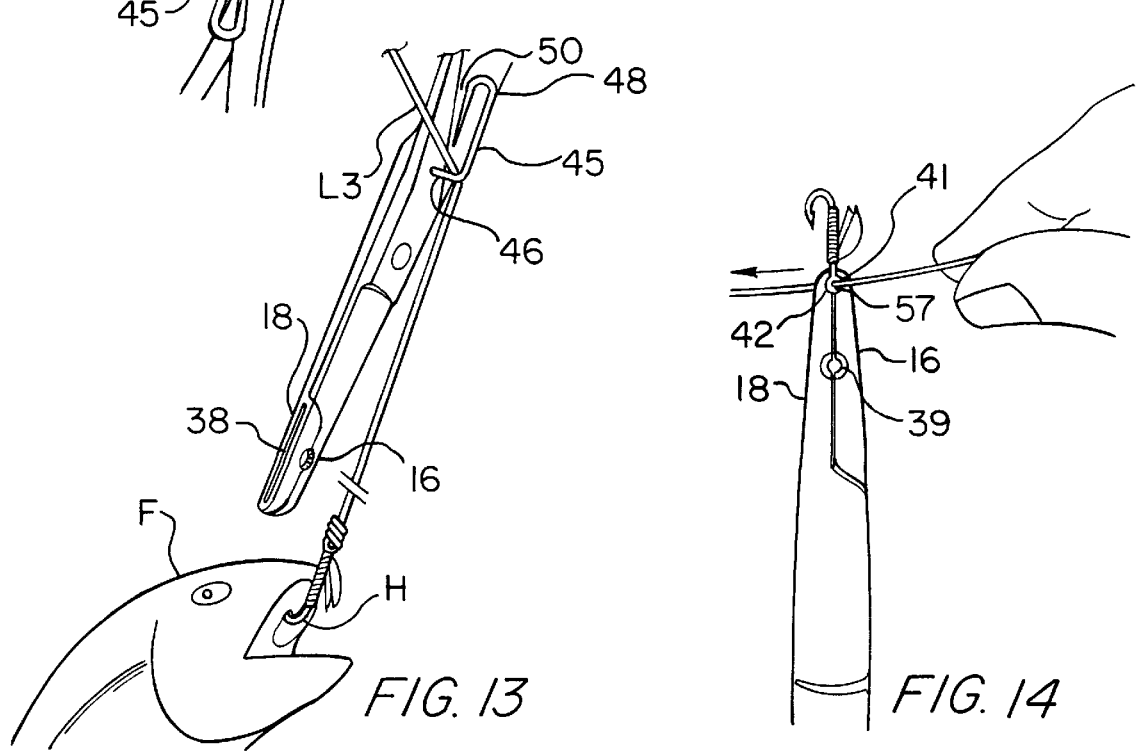
FIG. 13
FIG. 14 ic device shown in FIG. 1.

FISHING DEVICE

This application claims the benefit under 35 U.S.C. §119(e) of the U.S. Provisional patent application No. 60/062,807 filed Oct. 24, 1997.

TECHNICAL FIELD

This invention relates to fishing devices and more particularly to a novel fishing device capable of being used to perform a plurality of different functions useful to a fisherman.

BACKGROUND ART

Numerous attempts have been made to provide fishing devices that enable the user to tie line to eyelets on hooks, flies, swivels and the like line to line, cut line and flies and to readily remove the hook tied to a line from the mouth of a fish. No prior known fishing device has been provided to accomplish all of these functions in a handy, easy to use, efficient and reliable manner.

DISCLOSURE OF THE INVENTION

A fishing device is disclosed having a pair of opposed, pivoted arms. Each arm has a jaw head at a front end and a finger loop at the rear end. A latch having two opposite toothed ratchet sections on the arms enables the jaw heads to be held together in a locked, closed position, locked separated positions and released so that the jaw heads pivot away from one another to a spread open position. The jaw heads have a first pair of opposed transverse recesses that form a line tie hole. The jaw heads have first and second longitudinal grooves at opposite positions through which the end of a line may be passed for use with the line tie hole in tying knots to tie line to line and line to eyelets for either left or right handed users. The jaw heads have a second pair of opposed transverse recesses forming an eyelet threading hole for use as a threader for threading line through an eyelet held by the jaw heads. The arms have opposed cutting blades for cutting line and trimming flies. A line guide member on the side of one arm is used as a catch for holding a line to which a hook and fish is attached and to guide the line to direct the jaw heads to the hook for gripping thereof for releasing the fish from the hook. A pointed end of the guide member is used as an eyelet cleaner.

BRIEF DESCRIPTION OF THE DRAWINGS

Details of this invention are described in connection with the accompanying drawings which like parts bear similar reference numerals in which:

FIG. 6 is a top plan view of the fishing device of FIGS. 1–5 with the arms in a released open position.

FIG. 12 is a perspective view showing the use of the fishing device for tying of a knot in a line to tie a line to a line.

FIG. 13 is a perspective view showing the use of the line guide member for releasing a fish from a hook.

FIG. 14 is a top plan view of a front end portion of the fishing device showing the eyelet of a fly held between the jaw heads in an eyelet threading hole with the end portion of a line being threaded through the eyelet of the fly.

DETAILED DESCRIPTION

Figure 1:
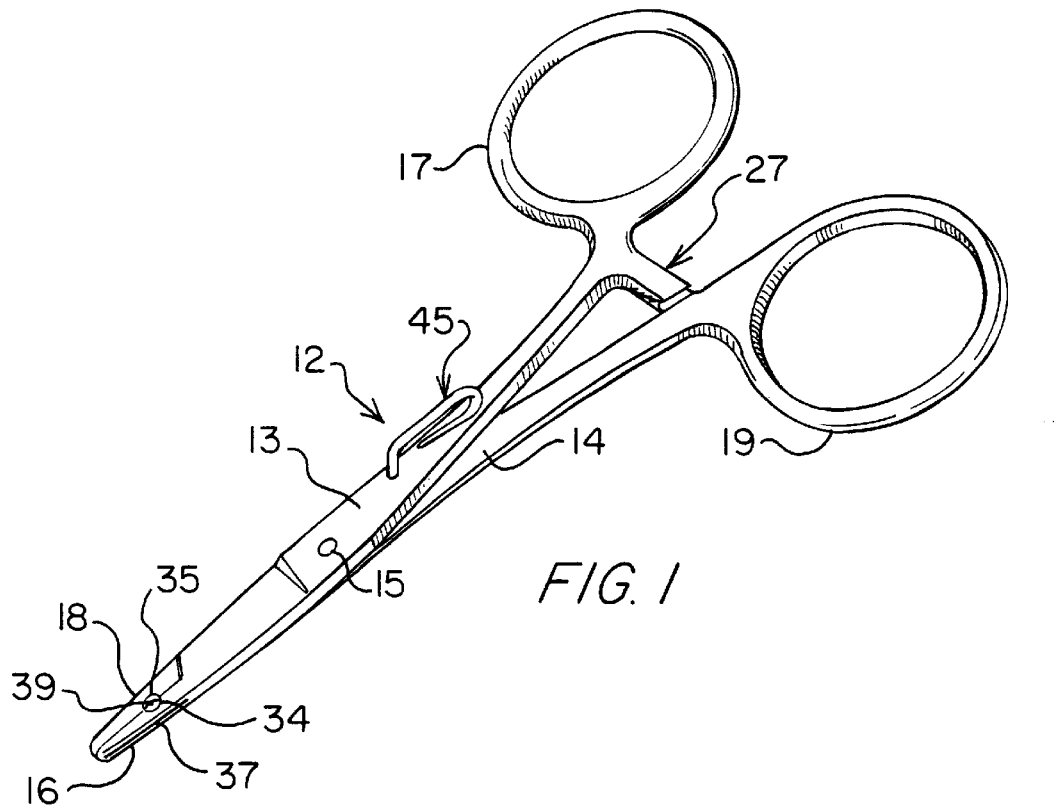
FIG. 1 is a perspective view of a fishing device embodying features of the present invention with the arms in the closed position.
Figure 2:
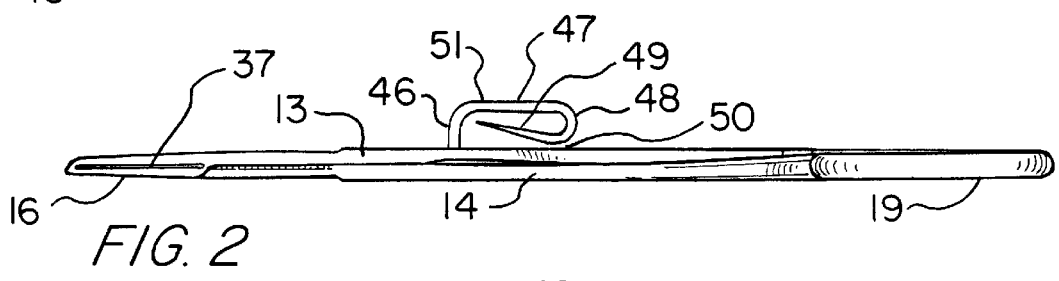
FIG. 2 is a left side elevation view.
Figure 3:
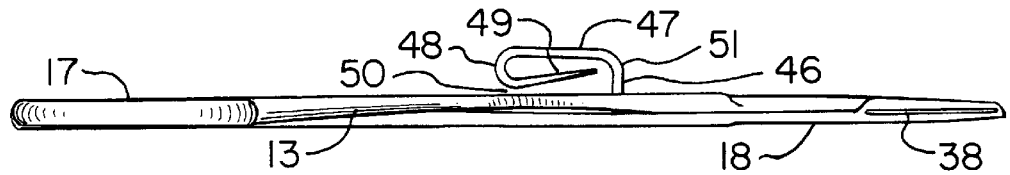
FIG. 3 is a right side elevation view.
Figure 4:
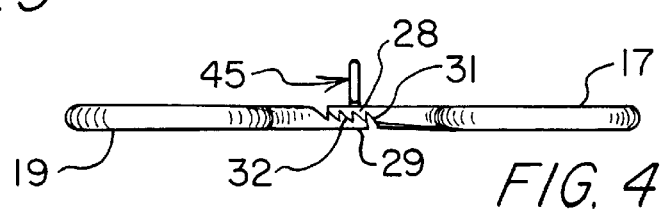
FIG. 4 is a rear elevation view.
Figure 5:
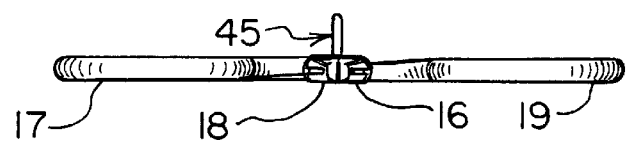
FIG. 5 is a front elevation view.
Figure 7:
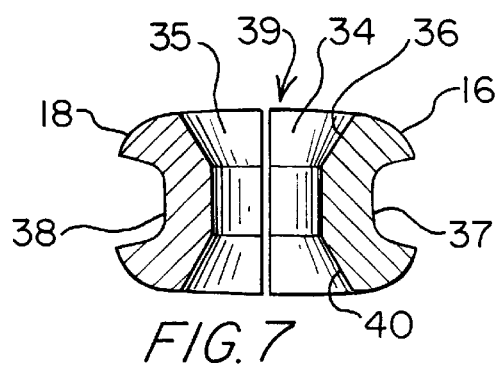
FIG. 7 is a sectional view taken along line 7—7 of FIG. 9.
Figure 8:
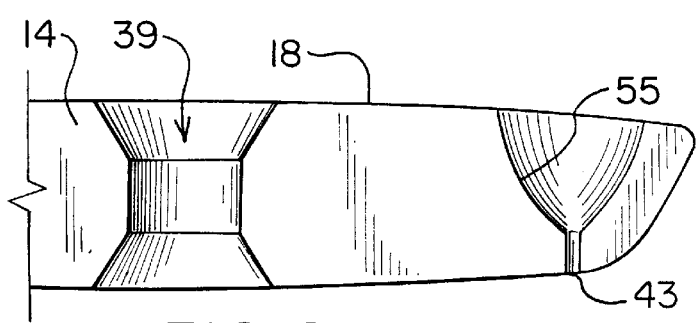
FIG. 8 is a sectional view taken along line 8—8 of FIG. 10.
Figure 9:
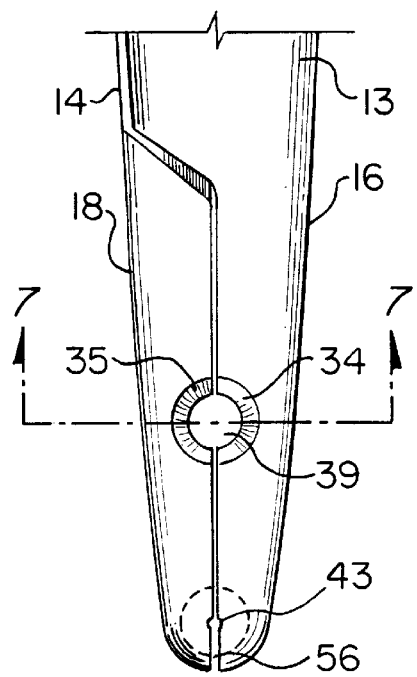
FIG. 9 is an enlarged top plan view of the front end portion of the fishing device shown in FIG. 1.
Figure 11:
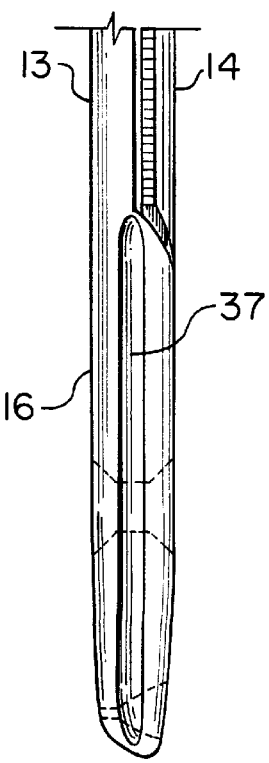
FIG. 11 is an enlarged side elevation view of the end portion of the fishing device shown in FIG. 2.
Figure 10:
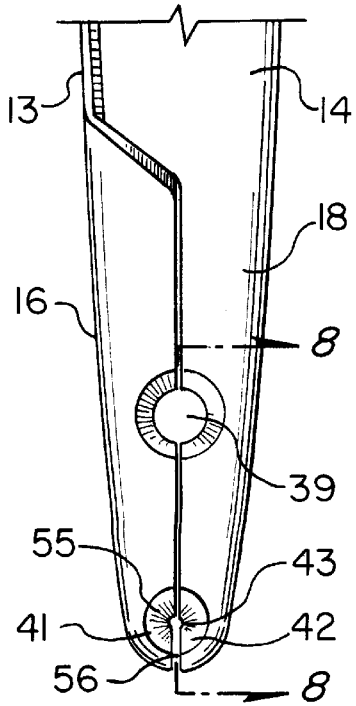
FIG. 10 is an enlarged bottom plan view of the front end portion of the fishing device on the opposite side of FIG. 9.

Referring now to the drawings there is shown a fishing device 12 which generally resembles a scissors. Fishing device 12 includes a pair of opposed first and second elongated arms 13 and 14 of a similar construction that are pivotally connected at a pivot 15 to move between open and closed positions. The first arm 13 has a first jaw head 16 at the front end and a first finger loop 17 at the rear end. The second arm 14 has a second jaw head 18 at the front end and a second finger loop 19 at the rear end. The first and second jaw heads have opposed flat inside gripping surfaces 21 and 22, respectively. Each jaw head is tapered inwardly toward the front end and has a rounded front end to assist in the sliding off a knot in a line formed on the jaw heads as hereafter described.

Opposed sharp cutting blades or blade portions 24 and 25 on arms 13 and 14, respectively, will cut like a scissors when the arms are moved to the closed position.

A latch 27 is provided for holding the arms in the closed position and at selected spaced slightly open positions and releasing the arms for pivotal movement away to a widely spread apart open position. The latch 27 shown has a first latch section 28 extending in from the first arm 13 and a second latch section 29 extending in from the second arm 14 with the latch sections overlapping one another in the closed position. The first latch section 28 has a plurality of spaced first teeth 31 (three shown) and the second latch section 29 has a plurality of spaced second teeth 32 (three shown) that allow the arms to be held either in the closed position or at spaced slightly spread positions and then release the arms for movement to a spread open position as required.

A first pair of opposed first and second transverse grooves 34 and 35 are provided in opposed inside surfaces of the first and second jaw heads 16 and 17, respectively. Grooves 34 and 35 form a line tie hole 39 when the jaw heads are in the closed position. Each groove 34 and 35 is tapered on both sides as indicated at 36 and 40. Specifically, each groove 34 and 35 is larger at an outer surface and converges inwardly on both sides to provide a dual-tapered hole 39 to facilitate insertion of the end of the line into and through the line tie hole 39 from either side. The hole 39 resembles two end to end funnels.

A first longitudinal groove 37 is provided in an outside surface of the first jaw head 16 opposite first gripping surface 21 and a second longitudinal groove 38 is provided in the second jaw head 17 opposite second gripping surface 22 and opposite the first longitudinal groove 37. One of the first and second longitudinal grooves 37 or 38 and line tie hole 39 is used by a fisherman to tie a knot in a line. This is illustrated in FIG. 12 for a right handed user gripping the device in the left hand with groove 38 facing up. In use a line L is held between the jaws and extends out. The end of a second line L1 is passed through the hole 39, wrapped a selected number of turns around the closed jaw heads and the end of the line L1 is passed through the longitudinal groove 38. The formed knot K is slid off the front end of the jaw heads, the jaw heads are spread open, and the line is pulled to tighten the knot K. The same procedure may be followed to tie a knot in an eyelet of a hook or tie a line to a line. The other longitudinal groove 37 enables a left handed user to grip the device in an inverted position from that shown in FIG. 12 with the longitudinal groove 37 facing up and the device used in the same manner as previously described to tie a knot in a line.

There is further provided a second pair of first and second transverse grooves 41 and 42 in the inside gripping surfaces 21 and 22 of jaw heads 16 and 17, respectively, to form an eyelet threading hole 43. Each groove 41 and 42 is generally semi-circular and has a single taper 55 being wider at an outer surface and converging inwardly to resemble a funnel. Each inside surface of each jaw head is stepped or recessed extending from the front end to the hole 43 to provide a gap 56 through which a hook shank connected to the hook eyelet may be passed when the jaw heads are in the closed position.

In use, an eyelet 57, typically an eyelet of a fly as shown, is held by the gripping surfaces 21 and 22 in the grooves 41 and 42 of the jaw heads 41 and 42 in the closed position (FIG. 14). The wider tapered hole allows the user to more easily pass the line through the eyelet, particularly for smaller sized flies and the like.

A line guide member 45 is provided on the first arm 13 for use in releasing a fish on a hook. The line guide member 45 has a front transverse end section 46 extending out from the arm 13 to limit the forward movement of the line, a side section 47 offset from the arm and extending rearwardly and parallel to the arm providing an inside guide surface and a rear transverse end section 48 extending down and forwardly of the side section to limit the rearward movement of the line. A return section 49 extends forwardly from the rear transverse end section in spaced relation to the arm 13 to form a passage or entry way with an opening 50 facing the rear end through which the line is passed to be received inside the line guide member 45. The return section 49 is coplanar with the side section 47 to shield the pointed end 51. The return section 49 terminates in a pointed end 51 for use as an eyelet cleaner. In use, as shown in FIG. 13, the arm 13 is moved against a line L3 holding a fish F hooked with a hook H on the end of the line. The line L3 is slid through the opening 50 and through the passageway first against the front transverse end section 46 so that the line L3 will slide back and forth against the inside of the side member and be limited in forward and rear movement by the front and rear transverse end sections 46 and 48. The jaw heads 16 and 17 are moved down to grasp the hook H which can then be readily removed from the mouth of the fish.

While using device 12, the thumb is placed in one finger loop and the third finger in the other finger loop like using a scissors. When not in use the jaw heads 16 and 18 of the device will readily grasp a portion of the clothing of the user and be held firmly when the arms are held by the latch in the closed position for carriage to a point of use.

From the foregoing it is apparent that the above device can be used as a threader for small hook eyelets, for tying fly lines to line such as leader and provides a scissors for cutting and trimming flies, is usable as a catch and release device, has a point for cleaning eyelets and is usable for hook removal.

Although the present invention has been described with a certain degree of particularity, it is understood that the present disclosure has been made by way of example and that changes in details of structure may be made without departing from the spirit thereof.

What is claimed is:

1. A fishing device comprising:
    a pair of opposed first and second arms pivotally connected at a pivot to move between an open position and a closed position,
    said first arm having a first jaw head at one end,
    said second arm having a second jaw head at one end,
    said first and second jaw heads having opposed inside gripping surfaces,
    a pair of first and second transverse grooves along an opposed inside surface of said first and second jaw heads, respectively, said first and second grooves forming a line tie hole with said jaw heads in said closed position, a longitudinal groove in an outer surface of one of said jaw heads through which line is passed usable with said line tie hole for tying a knot in a fishing line by passing a free end portion of a line through said line tie hole, wrapping said free end portion a selected number of turns around said jaw heads and passing said free end portion through said longitudinal groove, and
    releasable holding means for holding said arms in said closed position during said knot tying and releasing said arms to allow said jaw heads to be spread apart to release said knot from said jaw heads.

2. A fishing device as set forth in claim 1 wherein said releasable holding means is a latch including a first latch section extending in from said first arm having a series of spaced first teeth and a second latch section extending in from said second arm having a series of spaced second teeth, said first teeth being opposite and interfitting with said second teeth to lock said arms in said closed position and at one of a plurality of fixed distances and out from said closed position.

3. A fishing device as set forth in claim 1 wherein said first and second arms have opposed cutting blades for cutting in said closed position.

4. A fishing device as set forth in claim 1 wherein said jaw heads taper inwardly toward a front end and are rounded at the front end to assist in removing tied knots from said jaw heads.

5. A fishing device as set forth in claim 1 including a line guide member on one of said arms for use with said jaw heads griping a hook with a fish to guide said jaws to said hook to release the fish on said hook and line.

6. A fishing device as set forth in claim 5, said line guide member having a front transverse end section extending out from said one arm for limiting forward movement of a line, a side section extending parallel to said one arm, a rear transverse section extending toward said side section for limiting rearward movement of said line and a return section extending forwardly from said side section laterally outward of said one arm to form a passageway with an opening into which a line is passed to be stopped by said first and second transverse sections against forward and rear movement, said return section being coplanar with said side section.

7. A fishing device as set forth in claim 6 wherein said return section is tapered inwardly and terminates in a pointed end for use as an eyelet cleaner.

8. A fishing device as set forth in claim 1 wherein each of said first and second grooves is double tapered being wider at an outer surface on both sides and converging inwardly to facilitate insertion of the end of a line into said line tie hole.

9. A fishing device as set forth in claim 1 including a second longitudinal groove in an outside surface of said second jaw head opposite said longitudinal groove in said first jaw head for tying knots by left handed users.

10. A fishing device as set forth in claim 1 including a second pair of opposed semi-circular first and second transverse grooves along the inside of said first and second jaw heads adjacent the front ends thereof forming an eyelet threading hole through which a fishing line will pass to thread an eyelet held in said first and second transverse grooves by said first and second jaw heads in said closed position.

11. A fishing device as set forth in claim 10 wherein said second pair of first and second transverse grooves are single tapered being wider along an outer surface and converging inwardly.

12. A fishing device comprising:

a pair of opposed first and second arms pivotally connected at a pivot to move between an open position and a closed position, said first arm having a first jaw head at one end, said second arm having a second jaw head at one end, said first and second jaw heads having opposed inside gripping surfaces, a line guide member on one of said arms for use to guide a line to release a hooked fish and a hook on said line, said line guide member having a front transverse end section extending out from one of said arms for limiting the extent of forward movement of said line, a side section extending parallel to said one arm, a rear transverse section extending toward said side section for limiting the extent of rearward movement of said line and a return section extending forwardly from said side section laterally outward of said one arm to form a passageway open at a front end into which a line is passed to be retained by said first and second transverse sections, said return section being coplanar with said side section, said guide member guiding the line while the jaw heads grasp the hook to remove the hook from the mouth of a fish.

13. A fishing device comprising:

a pair of opposed first and second arms pivotally connected at a pivot to move between an open position and a closed position, said first arm having a first jaw head at one end and a first finger loop at an opposite end, said second arm having a second jaw head at one end and a second finger loop at an opposite end, said first and second jaw heads having opposed inside gripping surfaces for gripping a hook and the like, said first and second jaw heads having opposed cutting blade portions that cut in said closed position for cutting line and flies, a latch connected to said top and bottom arms for holding said arms in said closed position and releasing said arm sections for pivotal movement away from one another to said open position to allow said jaw heads to be spread apart to release a knot, a first pair of opposed first transverse grooves along the inside of said first and second jaw heads forming a tie hole usable in tying a knot in a fishing line by passing a free end portion of a line through said line tie hole, wrapping said free end portion a selected number of turns around said jaw heads and passing said free end portion through said longitudinal groove, a first longitudinal groove in said first jaw head through which line is passed for use in tying a knot, a second longitudinal groove in said second head opposite said first longitudinal groove for use by a left handed user, a second pair of opposed transverse grooves along the inside of said first and second jaw heads forming an eyelet threading hole through which a line will pass to thread a hook eyelet held in said grooves by said first and second jaw heads in said closed position, and a line guide member on one of said arms for use with said pair of jaw heads gripping a hook with a fish on said hook to guide said jaws to release said fish.

* * * * *